Figure 1:
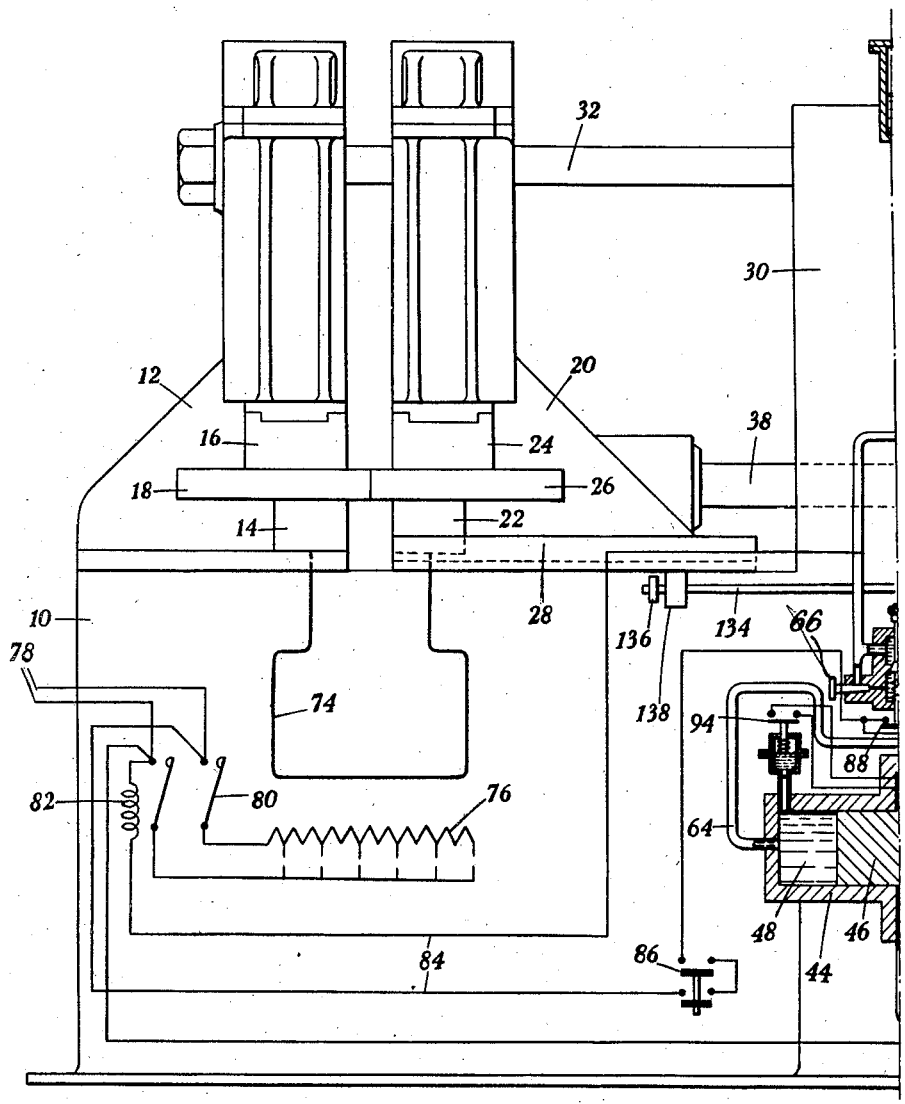

Jan. 16, 1940.      S. H. GORDON ET AL      2,187,452
ELECTRIC FLASH WELDING MACHINE
Filed Nov. 16, 1938      6 Sheets-Sheet 1

Inventors
S. H. GORDON
W. F. YOUNG.
by
Attorneys.

Jan. 16, 1940.　　　S. H. GORDON ET AL　　　2,187,452
ELECTRIC FLASH WELDING MACHINE
Filed Nov. 16, 1938　　　6 Sheets-Sheet 2

Inventors
S. H. Gordon,
W. F. Young,
by
Attorneys

Jan. 16, 1940. S. H. GORDON ET AL 2,187,452
ELECTRIC FLASH WELDING MACHINE
Filed Nov. 16, 1938 6 Sheets-Sheet 4

Inventors
S. H. Gordon.
by W. F. Young,
Attorneys

Jan. 16, 1940.　　S. H. GORDON ET AL　　2,187,452
ELECTRIC FLASH WELDING MACHINE
Filed Nov. 16, 1938　　6 Sheets-Sheet 5

Inventor
S. H. GORDON.
by W. F. YOUNG.
Attorneys

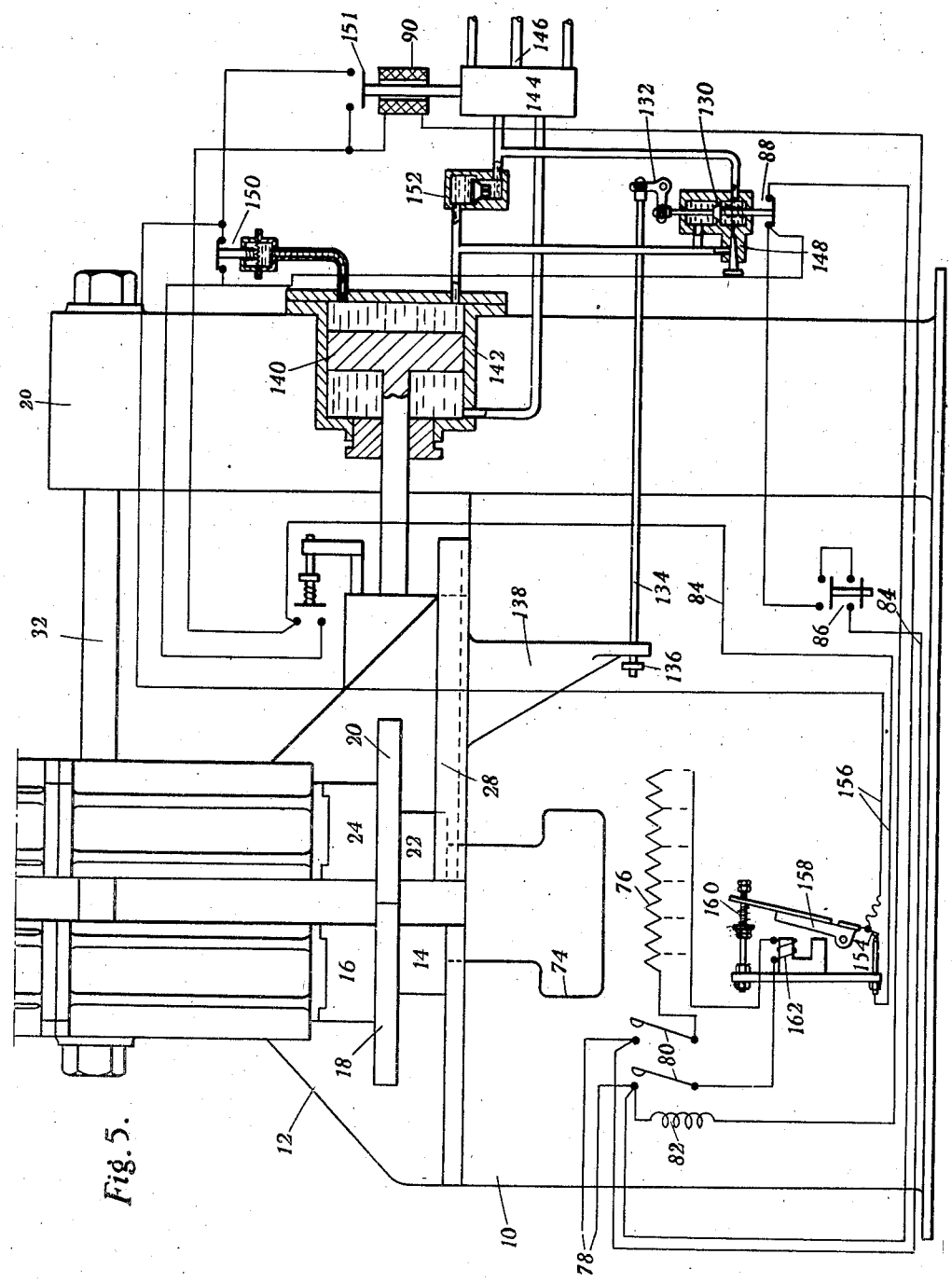

Patented Jan. 16, 1940

2,187,452

UNITED STATES PATENT OFFICE 2,187,452

ELECTRIC FLASH WELDING MACHINE

Samuel Hunter Gordon and William Forbes Young, Inverness, Scotland

Application November 16, 1938, Serial No. 240,870
In Great Britain November 17, 1937

11 Claims. (Cl. 219—4)

In welding by the "flashing" method the opposed surfaces of the two articles to be welded are brought together slowly (electric current being passed between them) so that when light contact is made sparking or arcing occurs which heats the articles locally. When the welding temperature is reached the two articles are pressed forcibly together and at the same time the electric current is cut off.

The preliminary heating of the articles by sparking or arcing is greatly increased if during the initial preheating stage of the flashing period the motion of approach is of a reciprocating character, consisting of rapid alternations of motion, which alternations strike the arcs between the opposed surfaces, these arcs being renewed and also distributed over the whole of the surfaces.

It has been proposed to bring about this reciprocating movement by means of direct electromagnetic action working in opposition to springs, the current through the primary winding of the main transformer being passed through the winding of the electromagnetic means whereby when current flows through this winding as a result of the two articles making contact, the articles are immediately drawn apart thus breaking the current and enabling the opposed springs to bring the parts together again.

The object of the present invention is to provide improved means for bringing about the aforesaid reciprocating movement and for resuming the continuous movement of approach of the workpieces under the sole control of the physical condition of the workpieces themselves, the reciprocating movement continuing so long as the metal remains hard and ceasing when it reaches a flashing temperature corresponding to the secondary voltage being used whereupon the workpieces approach one another at a uniform rate.

According to this invention the reciprocating movement is maintained by fluctuations of fluid pressure in the fluid operated feed mechanism brought about by the meeting together of the cold unsoftened workpieces. Thus, when the feeding movement is effected by air pressure opposed by an oil dashpot the meeting together of the workpieces will automatically cause a fall of pressure in the dashpot and this fall of pressure is detected by a flexible diaphragm or spring-loaded piston, thereby operating a switch or valve which actuates mechanism to reverse the feed movement thereby separating the workpieces, the forward feed movement being immediately resumed and these reversals of feed movement being repeated until the workpieces have become heated to a temperature at which the two parts will flash or burn away and thus the fall of pressure in the dashpot consequent upon their meeting does not occur, owing to the fact that no mechanical resistance is now opposed to the movement, with the result that the reverse movement does not take place and the workpieces approach one another continuously. Alternatively, when the feed movement is effected by a hydraulic ram to which liquid is supplied at a slow rate through a restricted orifice the meeting together of the cold workpieces will cause a rise of pressure in the hydraulic cylinder, which is detected by a diaphragm or piston in the manner described above to bring about successive reversals of feed movement which cease when the workpieces reach a flashing temperature.

Figure 1A:
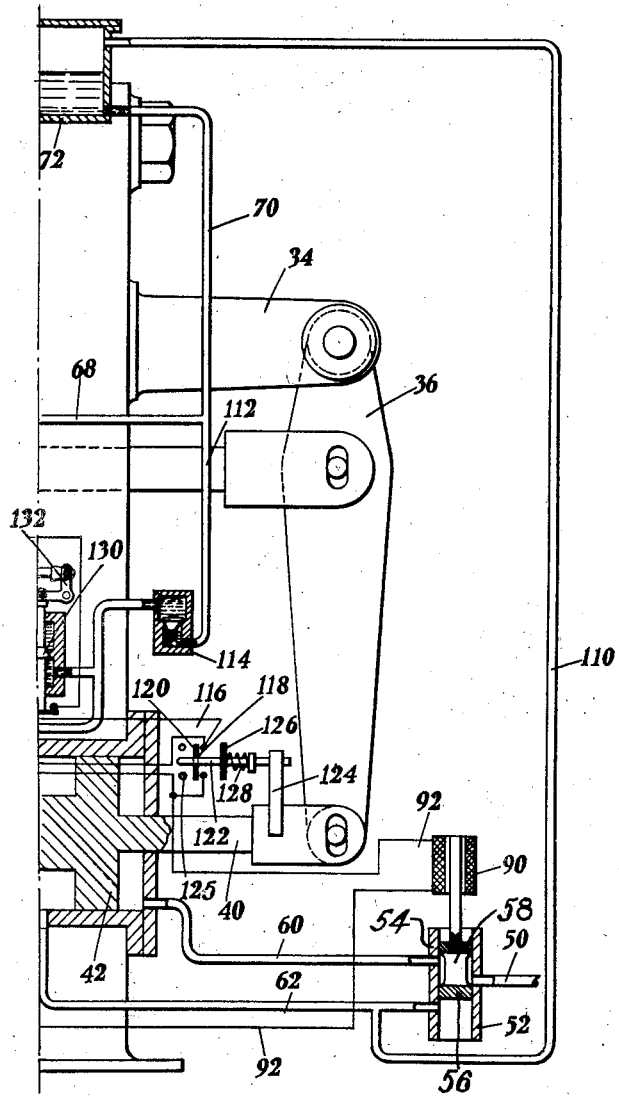
Figure 2:
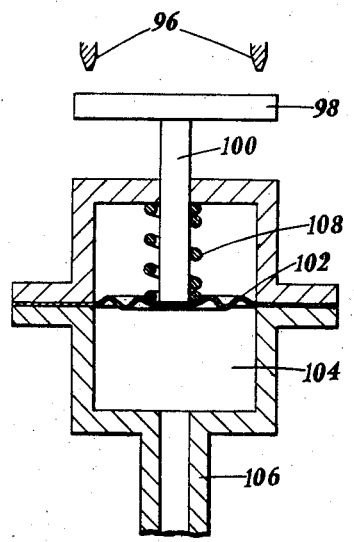
Figure 3:
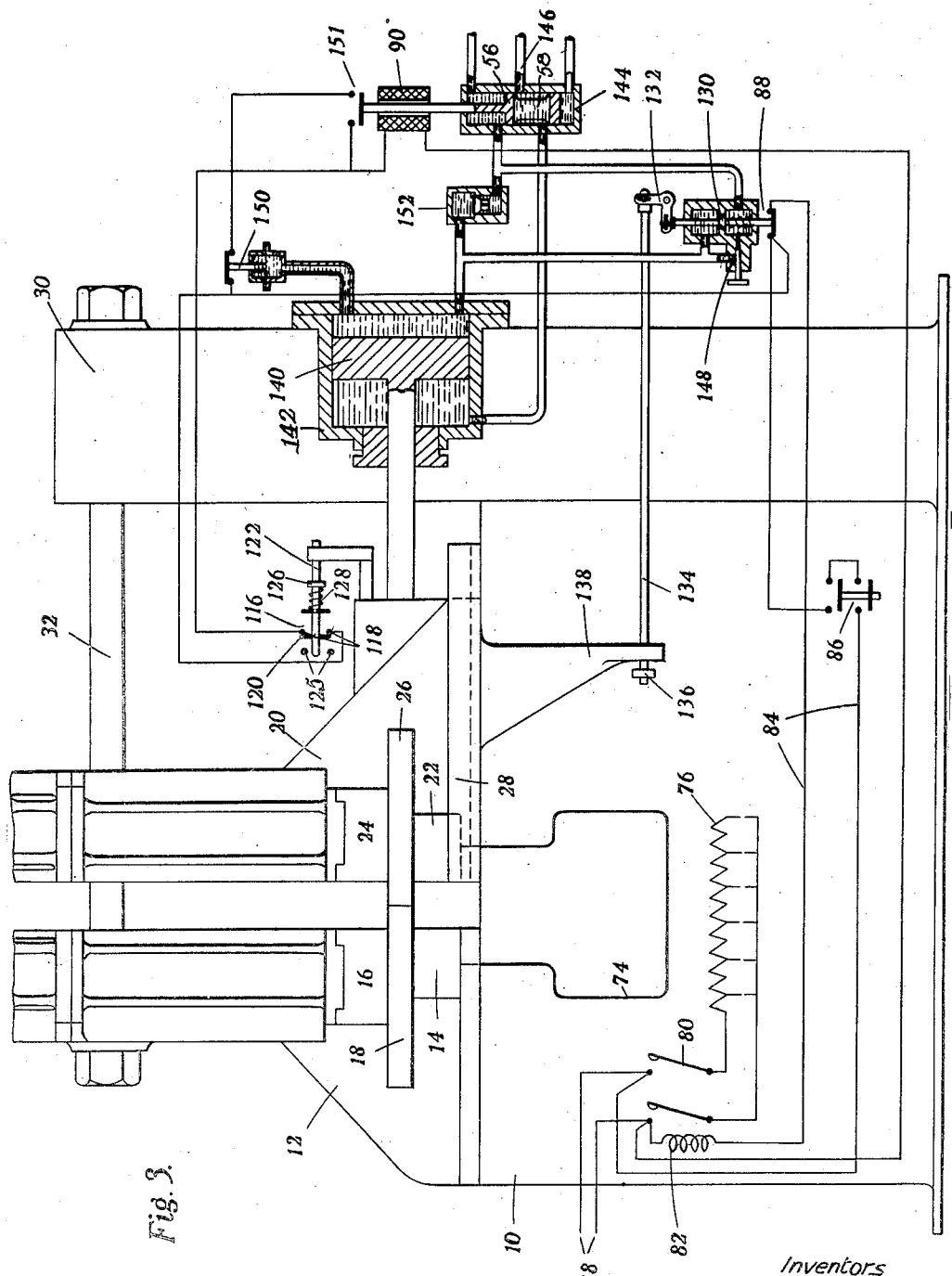
Figure 4:
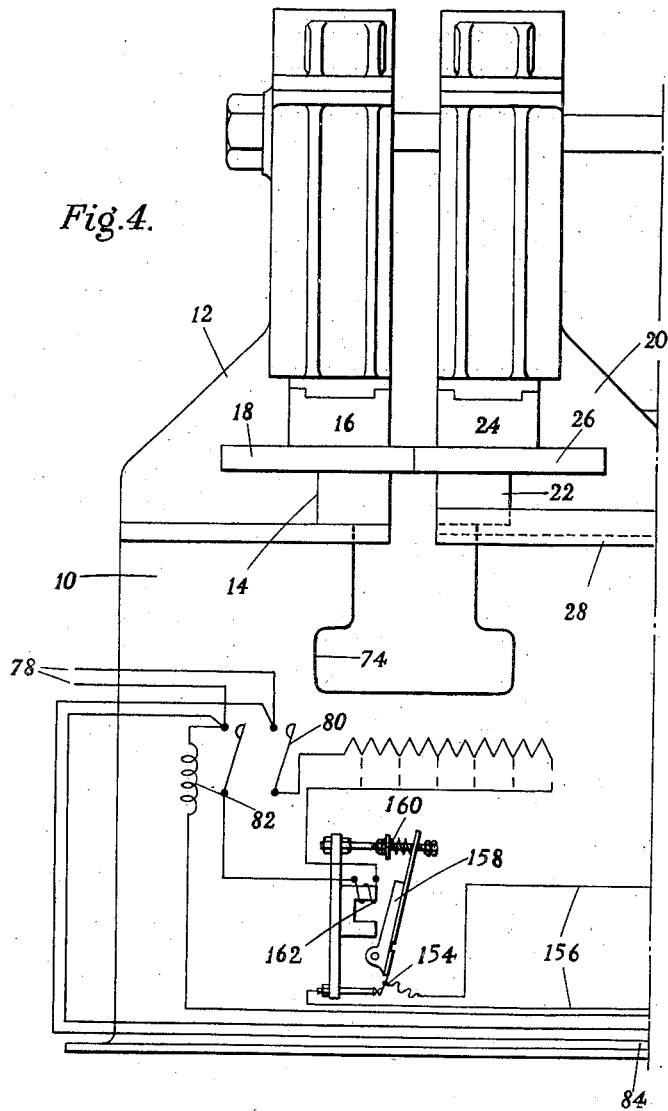
Figure 4A:
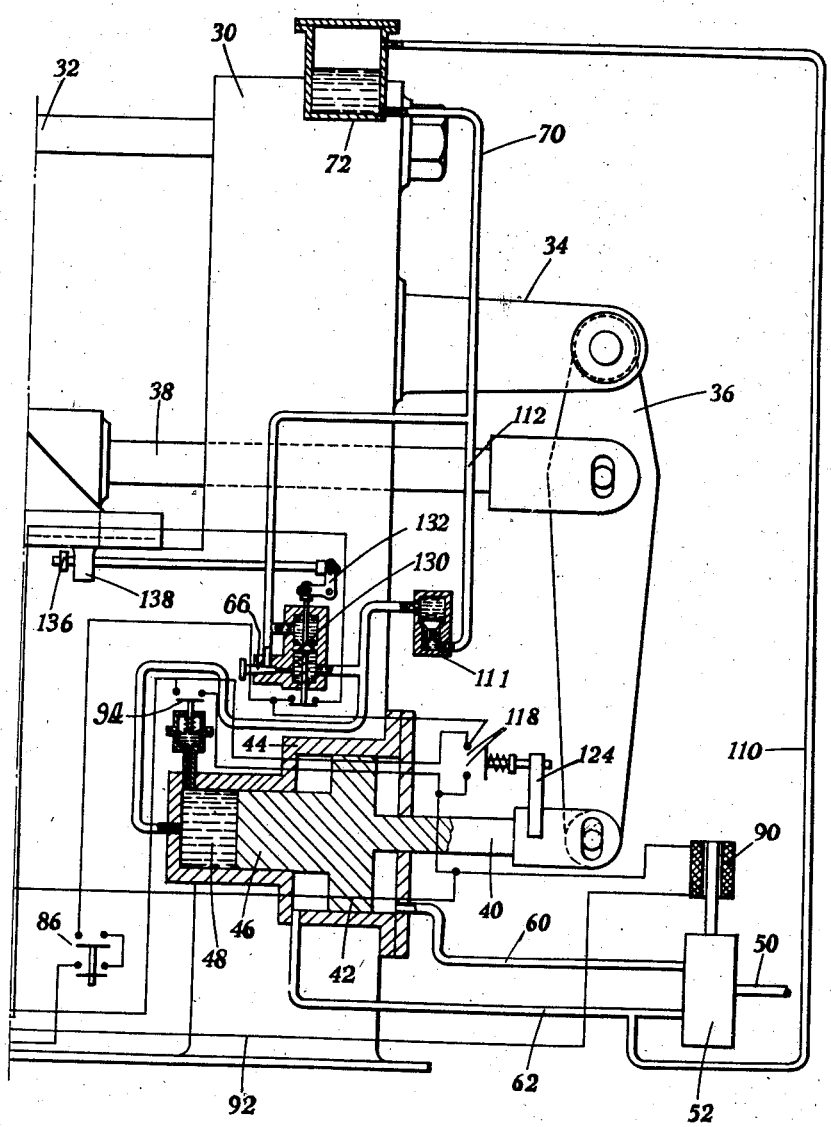

Referring to the accompanying drawings,

Figures 1 and 1a are a diagrammatic elevation of a pneumatically operated welding machine according to this invention, Figure 2 is a diagrammatic representation of a fluid pressure operated switch, Figure 3 is a view similar to Figure 1 of a hydraulically operated welding machine according to this invention, and Figures 4, 4a and 5 are views similar to Figures 1 and 3 respectively illustrating a modified motion-reversing means.

Corresponding parts are designated by the same reference numerals in the various figures of the drawings.

Referring first to Figures 1 and 2, the welding machine comprises a base 10, a fixed head 12 including an electrode 14 and a clamp 16 for clamping the workpiece 18 against the electrode, and a moving head 20 having an electrode 22 and a clamp 24 for the other workpiece 26. The moving head 20 is mounted in horizontal guides 28 so that the workpiece 26 can be moved towards and away from the workpiece 18.

A standard 30 is braced to the fixed head 12 by tie-rods 32 and carries a lug 34 to which is pivoted a lever 36. At an intermediate point in its length the lever is pivoted to a rod 38 attached to the moving head 20, and at its lower end the lever is connected by means of a piston rod 40 to a piston 42 sliding in a cylinder 44. The piston has an extension in the form of a plunger 46 moving in a dashpot cylinder 48 filled with oil. Air under pressure is supplied through a supply pipe 50, and a valve 52 which will be described more fully hereinafter, to one end or the other of the cylinder 44, the movement of the piston 42 caused thereby being transmitted by the lever 36 to the moving head 20. The valve 52 comprises a cylindrical barrel 54 within which slides a valve piston 56 having a transverse opening 58. When the piston 56 is in the position shown, air supplied through the pipe 50 passes through a pipe 60 to the right-hand end of the cylinder 44. When the valve piston 56 is moved downwards in the valve air from the pipe 50 enters the pipe 62 and passes into the left-hand end of the cylinder 44. In the position shown the pipe 62 is opened and air from the left-hand end of the cylinder can discharge into the atmosphere; in the lower position of the piston air from the right-hand end of the cylinder can discharge through the pipe 60 into the atmosphere.

Assuming that the valve piston 56 is in the upper position the pressure of air in the right-hand end of the cylinder will move the piston to the left, thus causing the workpiece 26 to approach the workpiece 18. The oil in the dashpot cylinder 48 will be put under pressure and will escape through a pipe 64 communicating with an adjustable needle valve 66. After passing through this valve the oil passes through pipes 68, 70 to an oil tank 72 carried by the standard 30. The needle valve 66 is adjusted so as to reduce the rate of travel of the piston 42, and therefore of the moving head 20 and workpiece 26 to the required value.

The welding current is supplied to the electrodes 14, 22 from the secondary winding 74 of a transformer the primary winding 76 of which is supplied with alternating current from the mains 78 through a double-pole relay 80 the winding 82 of which is in a circuit 84 containing a hand-operated switch 86 and another switch 88 the purpose of which will be described hereinafter. Assuming that the switch 88 is closed, closure of the switch 86 will energise the relay winding 82 thereby closing the contacts of the relay 80 to energise the primary winding 76 of the transformer.

The valve piston 56 is operated by a solenoid 90 which, when energised, holds the valve piston in the upper position, allowing it to move to the lower position when de-energised. The solenoid winding is in a circuit 92 which contains a pressure-operated switch 94 so arranged that when the pressure of the oil in the dashpot cylinder 48 is above a certain value the switch is closed, but when the pressure falls below that value the switch opens. Figure 2 illustrates one form of such a valve. It comprises two contact points 96 which are bridged by a disc 98 fixed to a rod 100 which is attached to a flexible diaphragm 102 forming the upper wall of a chamber 104 communicating with the interior of the dashpot cylinder by a pipe 106. The upward movement of the rod 100 is resisted by a spring 108 so adjusted that the contacts 96 are bridged by the disc 98 at the predetermined value of the oil pressure. It will be understood that this device is only given as an example; it may be replaced by any other kind of pressure-operated device, for example a spring-pressed piston or a Bourdon tube. Whatever device is used it is so adjusted that the contacts are closed, and the solenoid 90 maintained energised, while the moving head 20 is moving unhindered towards the left. As soon as the workpieces 18, 26 come into contact the movement of the piston 42 ceases, with the consequence that the pressure of the oil in the cylinder 48 falls. The spring 108 therefore pushes the rod 109 downwards thereby breaking the circuit 92 at 96. The solenoid is thereby de-energised, the valve piston 56 moves to its lower position thereby enabling the air in the right-hand end of the cylinder 44 to discharge into the atmosphere through the pipe 60 and at the same time putting the left-hand end of the cylinder into communication with the supply of pressure air through the pipe 62. The piston 42 is therefore moved to the right, thereby moving the head 20 to the right and separating the workpieces. A branch pipe 110 leads from the pipe 62 to the top of the oil-tank 72. When the valve piston 56 moves as described to its lowermost position pressure air enters the tank 72 through the pipe 110 and the oil in this tank returns to the cylinder 48 through a pipe 112 which by-passes the needle valve 66 and contains a spring-pressed non-return or check valve 114 which normally prevents oil from flowing upwards through the pipe 112.

In the embodiment of the invention shown in Figure 1 the backward movement of the moving head 20 continues until a switch 116 in parallel with the switch 94 is closed, thus re-energising the solenoid 90, thereby returning the valve piston 56 to its uppermost position, allowing air to escape from the left-hand end of the cylinder 44 and from the tank 72, and once more admitting air under pressure to the right-hand end of the cylinder driving the moving head 20 to the left. The pressure in the dashpot cylinder 48 rises again, causing the switch 94 to be closed so that the circuit through the solenoid is maintained notwithstanding that the switch 116 opens immediately after the piston 42 reverses its movement. As soon as the workpieces come into contact again the pressure switch 94 opens, the solenoid is de-energised, and the workpieces are separated again as described above. These alternations of movement continue until the workpieces attain a temperature at which they flash, and thus oppose no resistance to the forward movement, so that the pressure in the dashpot cylinder 48 does not fall. The pressure switch 94 is therefore not opened, the movement of the moving head is not reversed and the feed movement continues in the forward direction. Thus, the reciprocating movement of the moving head continues only so long as the workpieces have not attained the flashing temperature and ceases when this temperature is attained.

The switch 116 comprises two contact points 118 fixed to the base of the machine and a disc 120 capable of bridging these points. This disc 120 has a friction fit on a rod 122 carried on a bracket 124 fixed to the piston rod 40. During the movement to the left the disc 120 after disconnecting the contacts 118 encounters an adjustable stop 125. It will be evident that each successive reciprocation of the moving head 20 carries this head a little further to the left. This is allowed for because the rod 122 can be pushed through the disc 120, as will readily be appreciated. The rod 122 carries another disc 126, on the other side of the contact points 118, this disc sliding on the rod 122 against the pressure of a spring 128. This disc bridges the contacts 118 just before a valve 130, known as the butting valve, is opened. This valve is connected through a bellcrank 132 to a rod 134 carrying a stop 136 and extending through a hole in a lug 138 carried by the moving head 20. The stop 136 is so placed that it is encountered by the lug 138 at a predetermined point in the movement of the moving head, thereby opening the valve 130 to allow the oil in the cylinder 48 to escape rapidly. Thus, the workpieces are brought quickly and forcibly together to complete the weld. The purpose of the disc 126 is to close the contacts 118 just before this occurs, to ensure that the solenoid 90 shall not be de-energised, thereby reversing the movement of the moving head, as a consequence of the sudden fall of pressure in the cylinder 48 caused by the opening of the valve 130.

The moving part of the switch 88 previously referred to is carried by an extension of the stem of the valve 130, with the result that the switch is opened when the butting movement occurs, thereby de-energising the relay winding 82 and interrupting the circuit through the primary winding 76 of the transformer.

Referring now to Figure 3, the moving head 20 is operated directly by a hydraulic ram 140 in a cylinder 142 supplied with oil through a valve 144, which is broadly similar to the air valve 52, actuated by the solenoid 90. When the solenoid 90 is energised oil is supplied through the supply pipe 146 to the right-hand end of the cylinder 142 through a needle valve 148 similar to the needle valve 66 of Figure 1. A pressure operated switch 150 similar to the switch 94 of Figures 1 and 2 is connected to the right-hand end of the cylinder 142 but it differs from the switch 94 in that it is normally closed and is opened by a rise of pressure beyond a predetermined value. The pressure that exists in the right-hand end of the cylinder during unobstructed movement of the moving head 20 is insufficient to operate the switch, but when the workpieces come together the rise of pressure in the cylinder opens the switch thereby de-energising the solenoid 90, allowing the valve 144 to move to its lowermost position thereby enabling the oil in the right-hand end of the cylinder to escape through a check valve 152 and placing the left-hand end of the cylinder into communication with the oil supply pipe 146. Thus, the moving head is moved to the right to separate the workpieces. After a predetermined movement to the right the switch 116, similar to that described with reference to Figure 1, is closed to re-energise the solenoid, thereby causing the moving head to move once more to the left. The rod 122 of the switch 116 is in this case carried directly by the moving head 20. When oil in the right-hand end of the cylinder 142 escapes through the valve 152, the pressure drops in the right-hand end of cylinder 142 and allows the pressure switch 150 to close. A switch 151 is provided to prevent the closing of the pressure switch 150 from re-energising the solenoid 90 and is so arranged that it maintains the circuit of the solenoid 90 controlled by the pressure switch when the solenoid 90 is energised, and breaks it when the solenoid is de-energised.

Figure 4 illustrates an arrangement broadly similar to that shown in Figure 1 except that the resumption of forward movement of the moving head 20 is caused in a different way. In Figure 1 the solenoid 90 is re-energised by the disc 120 bridging the contacts 118. In Figure 4 this disc is omitted, although the disc 126 is retained and fulfills the same purpose as in Figure 1. The means for causing resumption of forward movement comprises a switch 154 in a circuit 156 in parallel with the pressure-operated switch 94. The operation of this switch 154 will therefore have the same effect as the operation of the switch 116 in the arrangement shown in Figure 1. The moving contact of the switch 154 is carried by a pivoted armature 158 provided with an adjustable spring 160 which tends to maintain the switch closed. An electromagnet 162 has its winding in series with the primary winding 76 of the transformer. When the workpieces come into contact the current through the primary winding 76 and through the electro-magnet winding causes the armature 158 to be attracted thereby opening the switch 154. As soon as the workpieces separate the current through the winding falls sufficiently to allow the spring 160 to re-close the switch 154, thereby re-energising the valve-operating solenoid 90 to cause the forward feed to be resumed. The pressure in the dashpot cylinder falls again when the workpieces come together the next time and the cycle of operations is repeated. The remainder of the sequence of operations takes place exactly as described with reference to Figure 1.

It will now be clear that the switch 154 can also be employed in place of the switch 116 to energise the solenoid in the construction illustrated in Figure 3, and this modification is illustrated in Figure 5. It is not necessary to describe the operations in detail because so far as the switch 154 is concerned the sequence of operations for reciprocating the moving head 20 is precisely the same as is described above in connection with Figure 4.

Although electrical devices have been described for controlling the mechanism which reverses the movement of the moving head, it will be evident that control mechanism of other kinds may be employed. Thus, for example, the pressure responsive diaphragm 102 or equivalent device may operate a valve to bring into action hydraulic or pneumatic control mechanism.

We claim:
1. In an automatic electric flash welding machine, in combination, fluid operated feeding means, means for reversing the direction of movement of said feeding means, and a device responsive to the alteration of fluid pressure in said feeding means, consequent on the meeting together of the workpieces, for bringing said reversing means into action.

2. In an automatic electric flash welding machine, in combination, fluid operated feeding means, means for reversing the direction of movement of said feeding means, a device responsive to the alteration of fluid pressure in said feeding means, consequent on the meeting together of the workpieces, for bringing said reversing means into action, and means for thereafter automatically putting said reversing means out of action independently of said pressure responsive device.

3. In an automatic electric flash welding machine, in combination, air pressure-operated feeding means, a liquid dashpot device restraining the forward feed movement, means for reversing the direction of movement of said feeding means, and a device responsive to the fall of liquid pressure in said dashpot device consequent on the meeting together of the workpieces, for bringing said reversing means into action.

4. In an automatic electric flash welding machine, in combination, air pressure-operated feeding means, a liquid dashpot device restraining the forward feed movement, means for reversing the direction of movement of said feeding means, a device responsive to the fall of liquid pressure in said dashpot device consequent on the meeting together of the workpieces, for bringing said reversing means into action, and means for thereafter automatically putting said reversing means out of action independently of said pressure-responsive device.

5. In an automatic electric flash welding machine, in combination, liquid pressure-operated feeding means, means for reversing the direction of movement of said feeding means, and a device responsive to the rise of liquid pressure in said feeding means, consequent on the meeting together of the workpieces, for bringing said reversing means into action.

6. In an automatic electric flash welding machine, in combination, liquid pressure-operated feeding means, means for reversing the direction of movement of said feeding means, a device responsive to the rise of liquid pressure in said feeding means, consequent on the meeting together of the workpieces, for bringing said reversing means into action, and means for thereafter automatically putting said reversing means out of action independently of said pressure-responsive device.

7. In an automatic electric flash welding machine, in combination, fluid operated feeding means, solenoid-operated means for reversing the direction of movement of said feeding means, a switch in the circuit of said solenoid, and a device responsive to the alteration of fluid pressure in said feeding means, consequent on the meeting together of the workpieces, for actuating said switch.

8. In an automatic electric flash welding machine, in combination, fluid operated feeding means, solenoid-operated means for reversing the direction of movement of said feeding means, a switch in the circuit of said solenoid, a device responsive to the alteration of fluid pressure in said feeding means, consequent on the meeting together of the workpieces, for actuating said switch, and means for thereafter automatically putting said reversing means out of action independently of said pressure responsive device.

9. In an automatic electric flash welding machine, in combination, fluid operated feeding means, solenoid-operated means for reversing the direction of movement of said feeding means, a normally-closed switch in the circuit of said solenoid, a device responsive to the alteration of fluid pressure in said feeding means, consequent on the meeting together of the workpieces, for opening said switch, a second switch in parallel with the switch first mentioned, and means for closing said second switch shortly after the opening of the first switch to reverse the condition of energisation of the solenoid.

10. The invention of claim 9 wherein said second switch is actuated directly by the reverse movement of the feeding means.

11. The invention of claim 9 wherein said second switch is biased towards the closed position and is maintained open electromagnetically by the current flowing in the welding transformer, whereby the diminution of current in said transformer consequent on the separation of the workpieces allows said switch to close.

SAMUEL HUNTER GORDON.
WILLIAM FORBES YOUNG.